United States Patent

Maffeis et al.

[11] Patent Number: 6,145,404
[45] Date of Patent: Nov. 14, 2000

[54] MODULAR MANIPULATION UNIT

[75] Inventors: Giuseppe Maffeis; Giuseppe Bellandi, both of Roncadelle, Italy

[73] Assignee: Gimatic S.p.A., Italy

[21] Appl. No.: 09/237,723

[22] Filed: Jan. 26, 1999

[30] Foreign Application Priority Data

Jan. 27, 1998 [IT] Italy .................... BS98A0002

[51] Int. Cl.$^7$ ............ B25J 18/02; F16C 33/02; F01B 31/00

[52] U.S. Cl. .................... 74/490.02; 74/490.01; 92/13.5; 92/59; 92/128; 92/169.1; 384/9; 384/42; 901/22

[58] Field of Search ............ 74/490.01, 490.02; 92/13.5, 59, 128, 169.1; 384/9, 42; 901/22

[56] References Cited

U.S. PATENT DOCUMENTS

| | | | |
|---|---|---|---|
| 3,350,143 | 10/1967 | Lichowsky | 384/42 |
| 4,516,476 | 5/1985 | Beaton | 92/59 |
| 4,941,197 | 7/1990 | Roeser | 384/44 |
| 5,431,087 | 7/1995 | Kambara | 92/146 |
| 5,560,281 | 10/1996 | Schneid | 92/61 |
| 5,609,091 | 3/1997 | Stoll | 384/42 X |

*Primary Examiner*—Allan D. Herrmann
*Attorney, Agent, or Firm*—McGlew & Tuttle, P.C.

[57] ABSTRACT

A modular manipulation unit is disclosed. The unit includes a body (11) formed of three extruded, profiled elements. The elements include a base plate (15), a top element or cover (16) fixed on the base plate, and an intermediate slide (17) arranged and guided between the base plate and the top element. An interface part (13) is fixed and movable with the intermediate slide, and an actuator is connected to the said intermediate slide for movements of same and of the gripping tool carried by the said interface part.

10 Claims, 4 Drawing Sheets

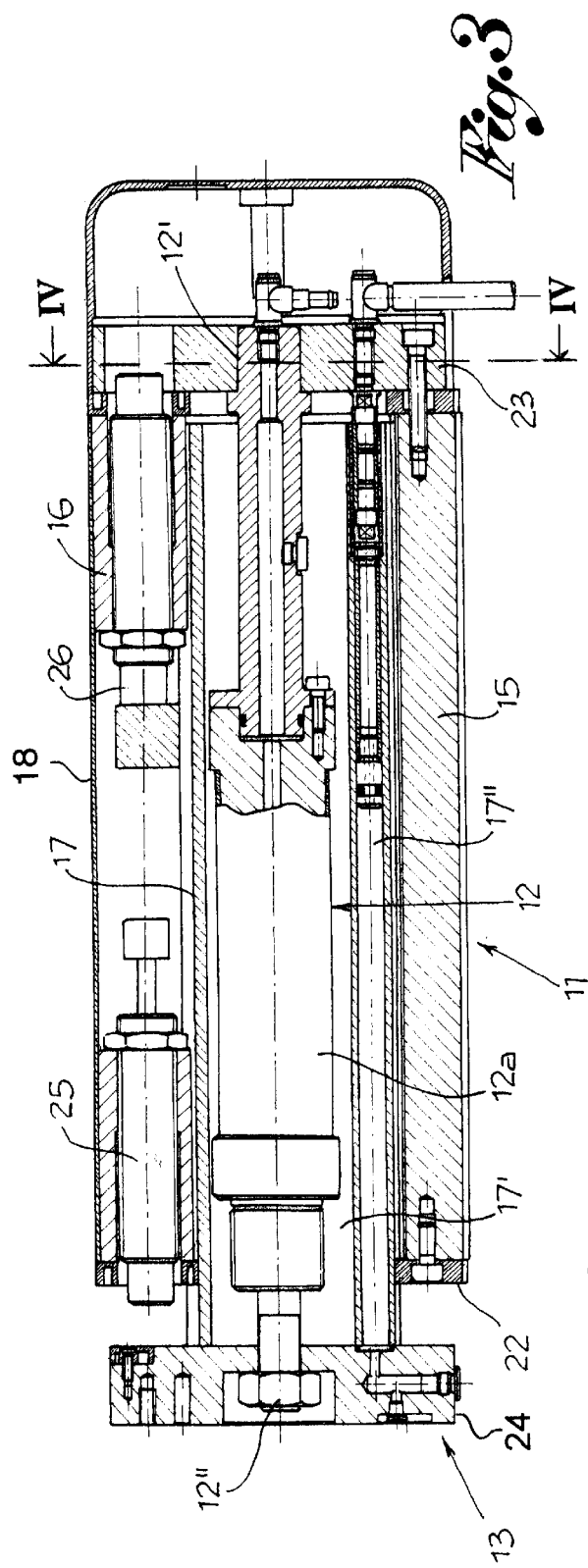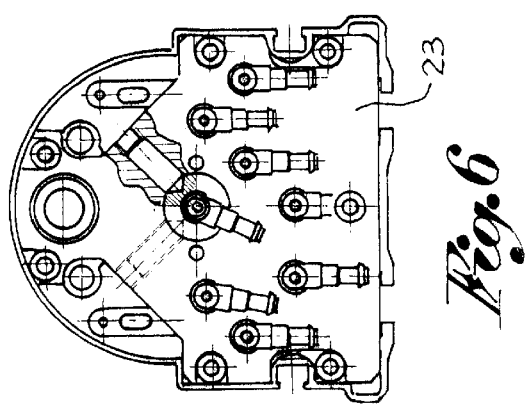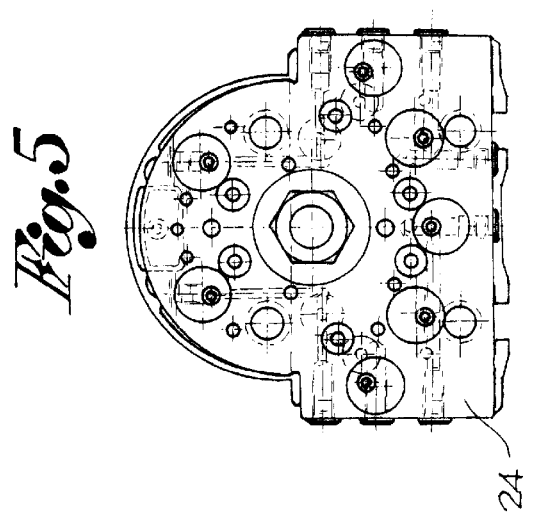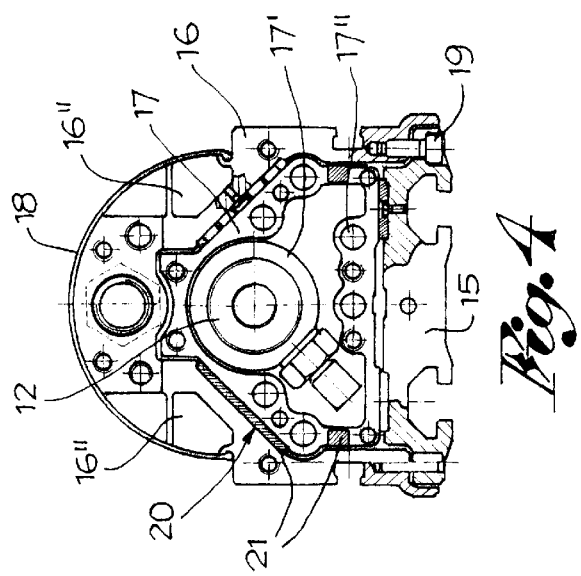

MODULAR MANIPULATION UNIT

FIELD OF THE INVENTION

The present invention pertains to modular manipulation units.

BACKGROUND OF THE INVENTION

Manipulation units, which are capable of linear and/or rotating movements in one or more directions, have already become known. They essentially comprise a support structure, one or more actuators, and a gripping gun.

According to the prior-art embodiments, the manipulation units are however heavy and thus have considerable inertias of starting and stopping, and have low rigidity and large clearances, which have a negative effect on their performance precision, and they are cumbersome since they have external tubes and additional channels.

SUMMARY AND OBJECTS OF THE INVENTION

The primary object of the present invention is to eliminate, or at least to reduce, such drawbacks thanks to a manipulation unit that has a structure that comprises elements that are lightweight, are easily assembled, have a high rigidity, and that, when they are assembled, make it possible to recover the clearances, even during use, and to delimit integrated channels so as to prevent the presence of additional channels, external tubes, etc., to the full advantage of a greater compactness and lesser hindrance of the unit.

According to the present invention, a manipulation unit having a support body that comprises three profiled elements, a base element, an intermediate element, and a top element, which are assembled like a "sandwich," and which can be used to prepare units of various shapes and performances in either a horizontal or vertical arrangement.

One or more of the starting elements also advantageously directly delimit or contribute to delimiting the fluid channels and/or the electric cable ducts in such a way that they become integrated in the body and are contained in the space of same.

Basically and according to the present invention, the three elements are extruded from aluminum or the like, contribute to forming a self-supporting and dynamic structure, one part of which can be moved with respect to the other parts without additional work or elements as the extruded elements are already suitable per se and ready to perform their task.

Greater details of the present invention will become more evident from the description given below with reference to the attached drawings.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 3 is a longitudinal sectional view of the unit of FIG. 2;

FIG. 4 is a cross sectional view of the unit according to the arrows IV—IV in FIG. 3;

FIG. 5 is a top view of the unit of FIG. 2;

FIG. 6 is a rear view of the unit of FIG. 2;

DESCRIPTION OF THE PREFERRED EMBODIMENT

Figure 1:
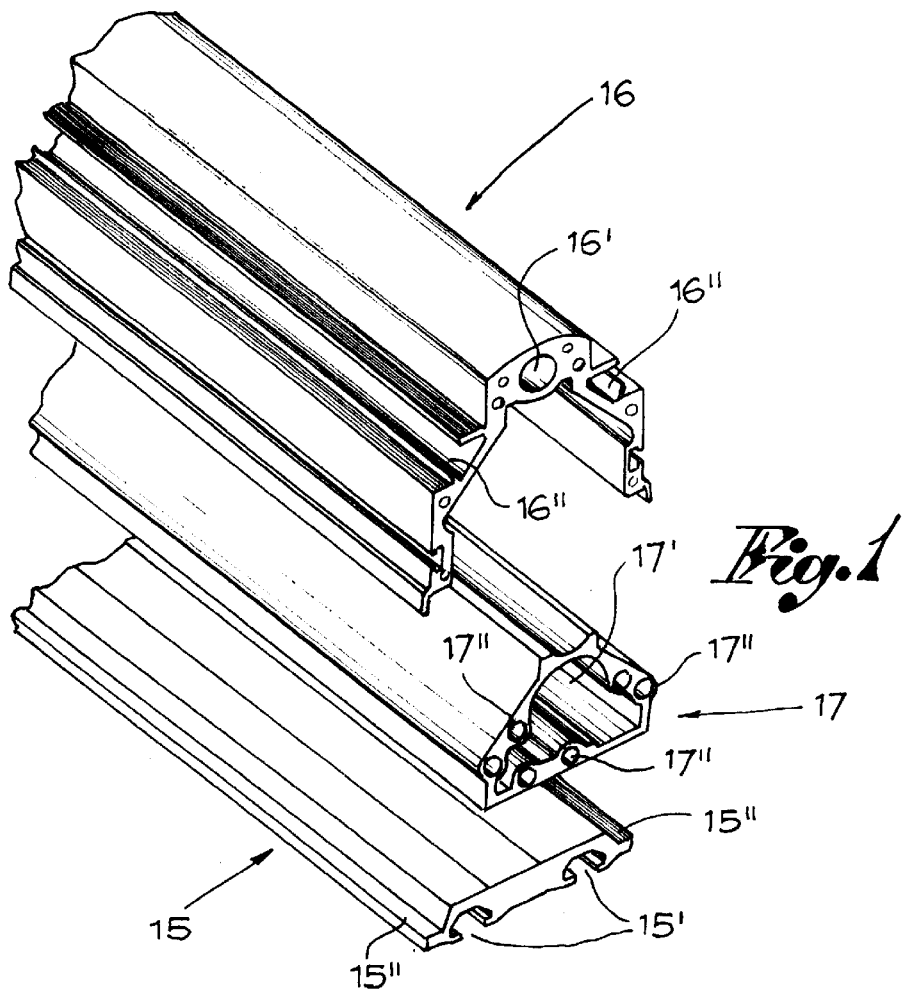
FIG. 1 is a perspective view of the three elements that contribute to forming the body of a manipulation unit.

Referring to the drawings in particular, a manipulation unit, as is shown in FIGS. 1–6, comprises a body 11, an actuator 12, at least one interface part 13 and at least one gripping tool 14.

The body 11 is composed of three profiled elements: a base plate 15, a top element or cover 16 and an intermediate slide 17 and of a covering case 18. The three profiled elements 15–17 are preferably and advantageously extruded from aluminum or its alloys.

More precisely, the base plate 15 has two underlying guide grooves 15' and two longitudinal wings 15" on opposite sides.

The top element or cover 16 has a section with a basically upside-down-V shape. It is housed and is fixed by means of bolts 19 on the wings 15" of the base plate 15, delimiting a longitudinal housing 20 with this.

The intermediate slide 17, which has a basically triangular cross section, is housed and slides in the housing 20, i.e., between the base plate 15 and the top element or cover 16, with sliding blocks 21 placed between them.

The covering case 18 is mounted on the top element or cover 16.

Two closing plates 22 and 23 are fixed at the front and rear ends of the base plate 15 and the cover 16, respectively, when they are assembled, with the front plate 22 having an opening for the passage of the intermediate slide 17, to which the interface part 13 in the form of a plate or a flange 24, to which the gripping tool 14 is applied directly or indirectly, is fixed beforehand.

The intermediate slide 17 has a longitudinal cavity 17' and a series of longitudinal channels 17" along its sides and coinciding with the same number of holes provided in the rear closing flange 23 and in the interface plate 13.

The actuator 12 controls the alternating movements of the slide 17, which supports the interface place 24. The actuator 12 is composed of a pneumatic cylinder 12a, which is housed in the cavity 17' of the slide 17, and which, on the one hand, is anchored in 12' at the rear closing plate, and, on the other hand, is connected in 12" to the interface plate 24.

The channels 17" in the slide 17 are utilized to carry a fluid coming from the pipes which are connected to the holes in the rear plate up to the pneumatic actuator and to the interface plate 24 to feed and to activate the tool 14 which is applied to same.

For its part the top element or cover 16 may have a longitudinal hole 16', in which adjustable limit stops 25 may be housed to stabilize the stroke of the slide as needed, as well as longitudinal grooves 16", which are closed towards the outside by the covering case 18 and in which electric cables directed at the interface plate may be passed.

The gripping tool 14 may be composed of an air gun that is of varied type, parallel, with three clamps, etc. which is applied directly and in line with the interface plate 24 or by means of an auxiliary angular interface element 27 and/or a rotating actuator 28 or traverse.

Figure 2:
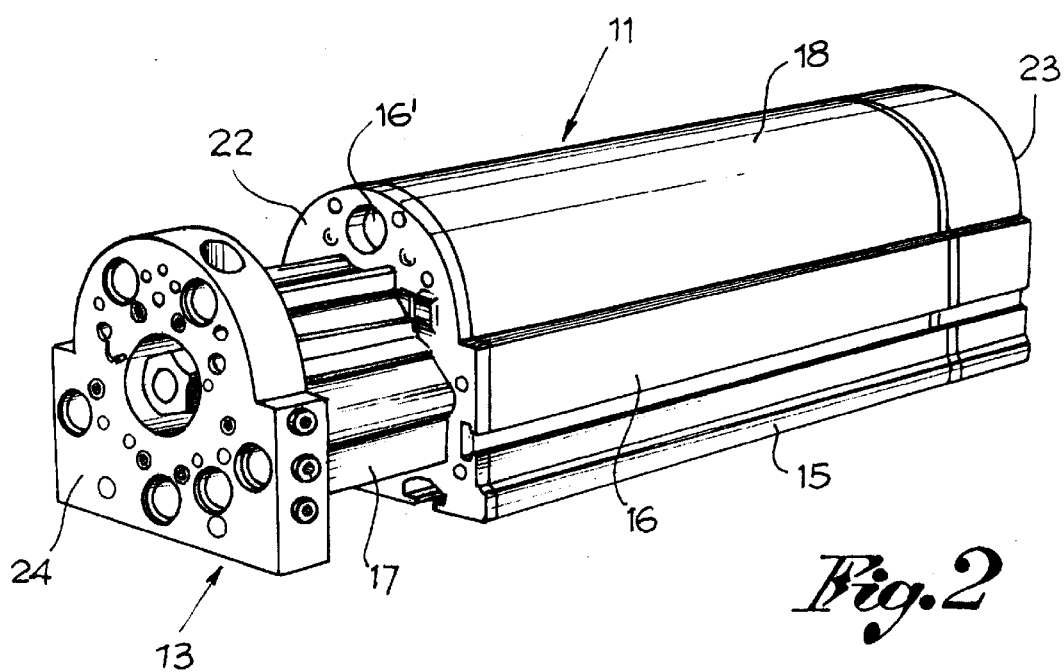
FIG. 2 is a perspective view of a simple, assembled, linear manipulation unit.

FIGS. 7–10 show some possible, varied embodiments of a manipulation unit besides the simpler one shown in FIG. 2.

Figure 7:
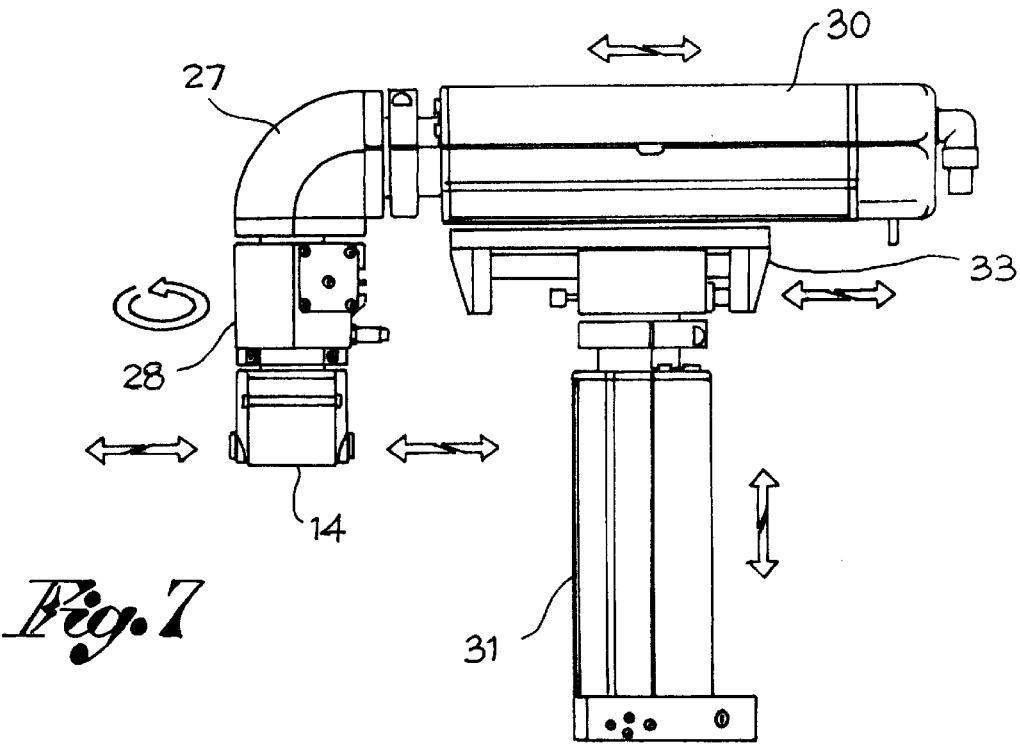
FIG. 7 is a view of an embodiment of a manipulation unit produced in accordance with the present invention.

For example, and as shown in FIG. 7, a linear unit 30 which is arranged horizontally and provided with a gripping tool 14 applied to the interface plate 24 by means of an auxiliary angular interface element 27 and a rotating actuator may be fixed by means of the base plate 15 on a ram 33 applied to the interface plate at the top of another linear unit 31 which is arranged vertically and acts as the lifting device in this case.

Figure 8:
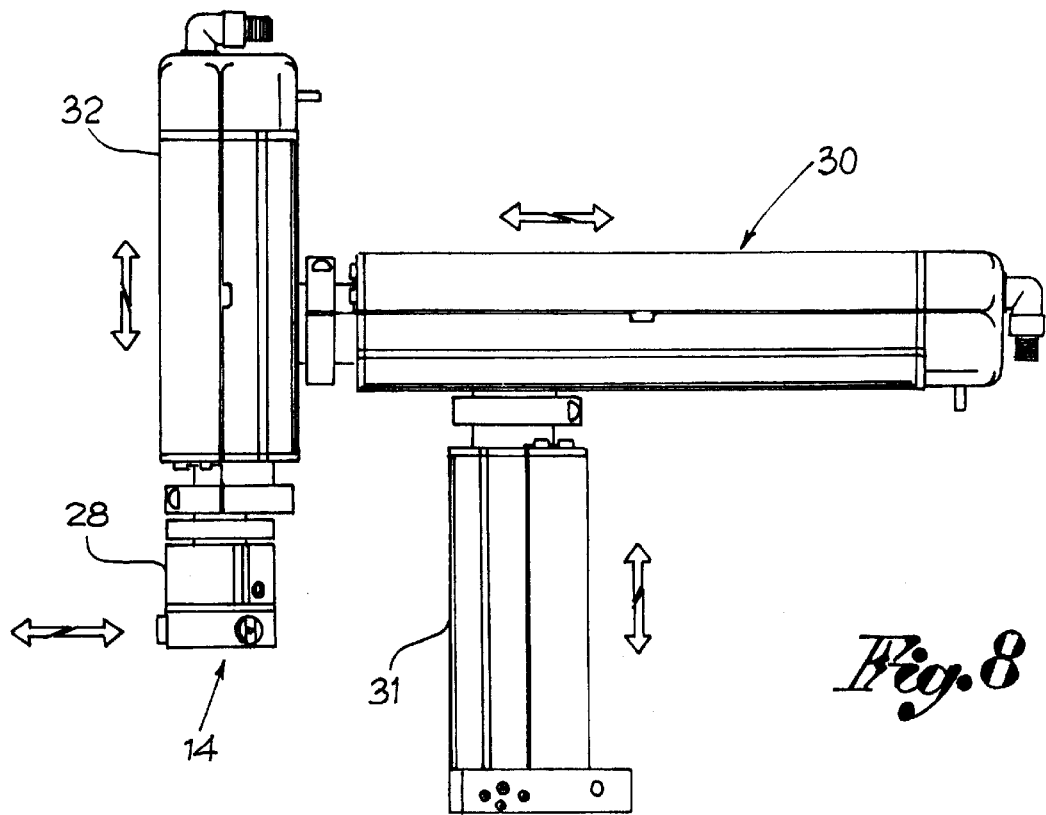
FIG. 8 is a view of an embodiment of a manipulation unit produced in accordance with the present invention.

FIG. 8 illustrates another example of a manipulator, in which a linear horizontal unit 30 is applied, but without a ram placed in between, to a vertical unit 31 that acts as the lifting device as in the embodiment of FIG. 7, and in which the gripping element is supported by another linear unit 32 which is arranged vertically and is fixed to the interface plate of the horizontal unit 30.

Figure 9:
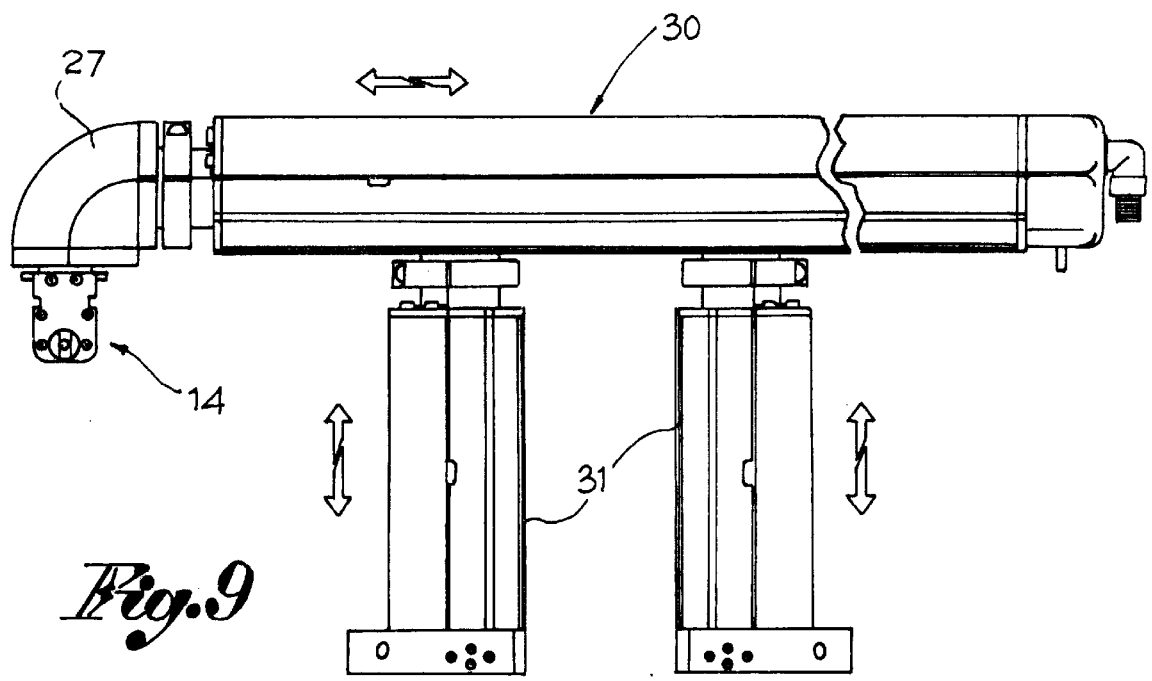
FIG. 9 is a view of an embodiment of a manipulation unit produced in accordance with the present invention.

FIG. 9 shows in its turn an embodiment of a manipulator similar to that in FIG. 7 but with the linear horizontal unit 30 being more extended and being supported by two vertical units 31, 31 acting as lifting devices.

Figure 10:
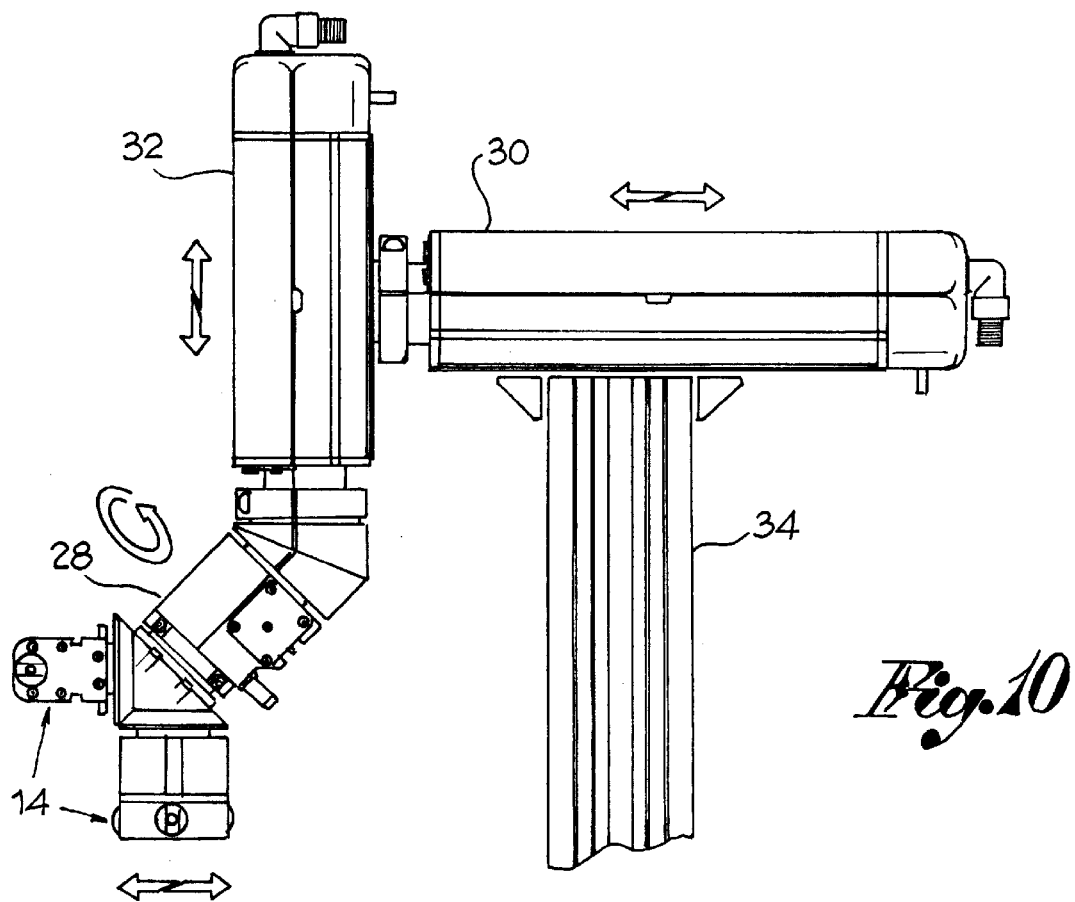
FIG. 10 is a view of an embodiment of a manipulation unit produced in accordance with the present invention.

Finally, FIG. 10 illustrates an embodiment of a manipulator composed of a horizontal linear unit 30, a vertical linear unit 32 supporting two different gripping tools 14, 14 by means of traverse elements, and of a fixed column 34.

Therefore, it is evident how, starting from elements that are simple and easy to assembly, it is possible to embody a modular manipulation unit of varied shape that is able to satisfy the widest variety of use requirements.

While specific embodiments of the invention have been shown and described in detail to illustrate the application of the principles of the invention, it will be understood that the invention may be embodied otherwise without departing from such principles.

What is claimed is:

1. A modular manipulation unit, comprising:
   a body;
   a linear actuator in said body;
   at least one interface part at one end of said body and movable with said actuator;
   at least one gripping tool applied directly or indirectly to said interface part, the actuator being a pneumatic cylinder and said tool being a parallel air gun or an air gun with clamps, said body including three extruded profiled elements with a base plate, a top element which is fixed to said base plate and an intermediate slide, which is arranged and guided between said base plate and said top element, said interface part being fixed and movable on said intermediate slide, said actuator being connected to said intermediate slide for movement of same and of said gripping tool supported by said interface part;
   two closing plates fixed at opposite ends of said base plate, wherein said intermediate slide has a longitudinal cavity for housing said actuator and longitudinal channels, which coincide with holes made in said closing plates and which are intended to carry a fluid from one to the other of these channels by means of said slide and for feeding said actuator and said tool on said interface part.

2. The modular manipulation unit in accordance with claim 1, wherein said top element has a longitudinal hole to receive accessory elements and has longitudinal grooves for the passage of electric cables, said grooves being closed by a covering case arranged mounted on said top element.

3. The modular manipulation unit according to claim 1, wherein at said interface part of the modular unit, it is possible to apply, by means of said base plate, another modular unit that is arranged at right angles to the modular unit, with said another modular unit acting as the lifting device or as a tool-holding unit.

4. A modular manipulation unit, comprising:
   a base plate;
   a top element;
   an intermediate slide, said top element and said base plate are assembled with said intermediate slide arranged in a housing delimited by said base plate and said top element;
   two closing plates fixed at opposite ends of said base plate; and
   sliding blocks placed between said intermediate slide and said housing with said intermediate slide passing in an opening provided in one of said closing plates.

5. The modular manipulation unit in accordance with claim 4, wherein said intermediate slide has a longitudinal cavity for housing an actuator and longitudinal channels, which coincide with holes made in said closing plates and which are intended to carry a fluid from one to the other of these channels by means of said slide and for feeding said actuator and a tool on said interface part.

6. The modular manipulation unit in accordance with claim 4, wherein said top element has a longitudinal hole to receive accessory elements and has longitudinal grooves for the passage of electric cables, said grooves being closed by a covering case arranged mounted on said top element.

7. The modular manipulation unit according to claim 4, wherein at said interface part of the modular unit, it is possible to apply, by means of said base plate, another modular unit that is arranged at right angles to the modular unit, with said another modular unit acting as the lifting device or as a tool-holding unit.

8. A modular manipulation unit, comprising:
   a body;
   a linear actuator in said body;
   at least one interface part at one end of said body and movable with said actuator;
   at least one gripping tool applied directly or indirectly to said interface part, said body including three extruded profiled elements with a base plate, a top element which is fixed to said base plate and an intermediate slide, which is arranged and guided between said base plate and said top element, said interface part being fixed and movable on said intermediate slide, said actuator being connected to said intermediate slide for movement of same and of said gripping tool supported by said interface part, said top element having a longitudinal hole to receive accessory elements and having longitudinal grooves for the passage of electric cables, said grooves being closed by a covering case arranged mounted on said top element.

9. The modular manipulation unit in accordance with claim 8, further comprising two closing plates fixed at opposite ends of said base plate, wherein said intermediate slide has a longitudinal cavity for housing said actuator and longitudinal channels, which coincide with holes made in said closing plates and which are intended to carry a fluid from one to the other of these channels by means of said slide and for feeding said actuator and said tool on said interface part.

10. The modular manipulation unit according to claim 8, wherein at said interface part of the modular unit, it is possible to apply, by means of said base plate, another modular unit that is arranged at right angles to the modular unit, with said another modular unit acting as the lifting device or as a tool-holding unit.

* * * * *